May 16, 1933.  J. W. GREIG  1,908,839
DOOR BUMPER
Filed Feb. 24, 1931

Inventor.
James W Greig.
By MacLeod Calver Copeland &c
Attorneys.

Patented May 16, 1933

1,908,839

UNITED STATES PATENT OFFICE

JAMES W. GREIG, OF GROSSE POINTE PARK, MICHIGAN, ASSIGNOR TO HUDSON MOTOR CAR COMPANY, OF DETROIT, MICHIGAN, A CORPORATION OF MICHIGAN

DOOR BUMPER

Application filed February 24, 1931. Serial No. 517,750.

This invention relates to bumpers or cushioning devices for doors of metal automobile bodies.

It is customary in automobile bodies to provide resilient bumpers for cushioning the impact between the door and door jamb, said bumpers also serving to prevent rattling of the parts when the door is closed. To the latter end, it is desirable that the bumpers be mounted to enable them to relatively and resiliently position the cooperating latch elements on the door and door post or pillar without lost motion. Various types of adjustable bumpers have been proposed in order to meet satisfactorily this requirement.

The present invention has for its object to provide a simple and inexpensive bumper block which, while sufficiently rigid to permit the same to be securely fastened in fixed position to a door or body pillar, is, on the other hand, sufficiently compressible to enable it automatically to adapt itself to minor variations in dimensions or wear between the parts without the necessity of adjustment.

Before explaining in detail the present invention, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawing; in which, Fig. 1 is a fragmentary horizontal section of the free edge of an automobile door, together with the cooperating door post or body pillar, and associated parts;

Figure 1:
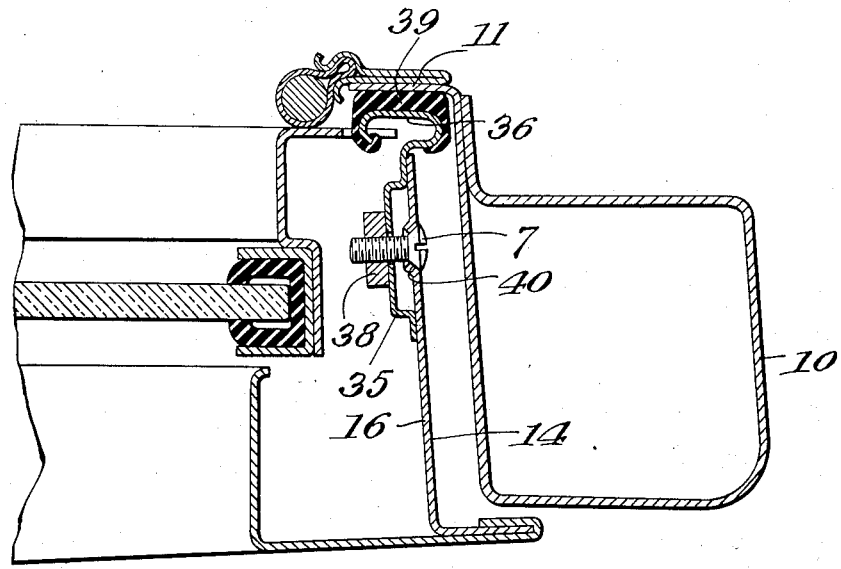
Figure 2:
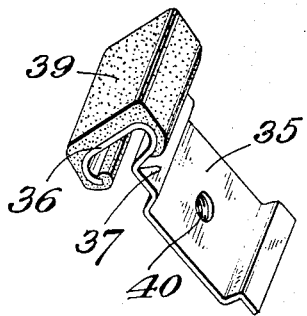
Fig. 2 is a detail perspective view of the bumper shown in Fig. 1.
Figure 3:
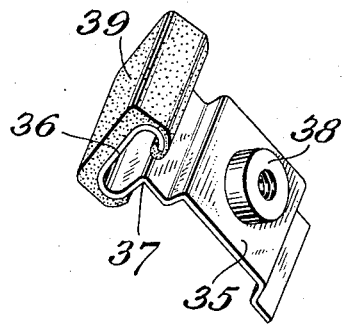
Fig. 3 is a similar view looking from the opposite side of the bumper.

One embodiment of the invention is illustrated in Figs. 1 to 3 of the accompanying drawing as applied to the door of a closed metal automobile body having a sheet metal door post or pillar 10 formed with a flange 11 constituting a door jamb and carrying a retainer 12 for a windlace 13, said windlace engaging the interior of the door adjacent the free edge of the latter. The door as shown includes a pillar 14 located at the free edge of the door, said pillar being composed of sheet metal and of a suitable section to provide an inner web 15 and legs or flanges 16 and 17. The flange 16 extends transversely of the door at the free edge of the latter and is formed with a lip 18 overlying the pillar 10 and about which is crimped the edge of an outside panel 19 having a window opening 9. The flange 17 of the pillar 14 defines one edge of the window opening at the inner side of the door and has secured thereto window guides 20 containing rubber or other runs 21 for the window glass 22. Except as hereinafter pointed out, the parts above referred to may be of any usual or suitable construction and arrangement.

The bumper to which the present invention relates comprises a strip of sheet material, such as sheet metal, folded to provide a body portion 35, preferably, of channel form and a head portion 36 resiliently connected by the bent portion 37. A threaded clinch nut 38 is suitably secured to the body portion, as by welding. The head portion 36 is preferably provided with a striking face 39 of rubber or other suitable cushioning material vulcanized or otherwise secured thereto. The bumper is secured upon the flange 16 of the door pillar 14 as by a screw 7 passing through an opening 40 in the body portion and engaging the threaded portion of the nut 38. When the door is closed the face 39 of the head portion of the bumper resiliently engages the flange 11 of the door post 10.

It will be seen that the bumper of the invention is of very simple and inexpensive construction and can be readily attached to the pillar. When once attached, a bumper of this construction maintains resiliently, at all times, the relative position of the cooperating latch elements on the door and door post or pillar without lost motion and without further adjustment.

I claim:

1. A door bumper for interposition between a door and jamb and comprising a strip of sheet material folded to provide a firm body portion adapted to be fastened to one of said parts and a head portion resiliently connected with the body portion, said head portion having a face adapted to engage the other of said parts.

2. A door bumper for interposition between a door and jamb and comprising a strip of sheet material folded to provide a firm body portion adapted to be fastened to one of said parts and a head portion resiliently connected with the body portion, said head portion having a rubber face adapted to engage the other of said parts.

In testimony whereof I affix my signature.

JAMES W. GREIG.